United States Patent [19]

Klansnic et al.

[11] Patent Number: 4,904,999
[45] Date of Patent: Feb. 27, 1990

[54] FAULT MONITORING SYSTEM FOR AIRCRAFT POWER CONTROL UNITS

[75] Inventors: James E. Klansnic, Bellevue; Bernus G. Turner, Woodinville, both of Wash.

[73] Assignee: The Boeing Company, Seattle, Wash.

[21] Appl. No.: 479,723

[22] Filed: Mar. 28, 1983

[51] Int. Cl.⁴ ............................................. G05B 9/03
[52] U.S. Cl. ................................. 340/945; 73/802; 91/509; 244/194; 318/564; 318/565
[58] Field of Search ........... 340/665, 963, 945, 870.31, 340/870.35; 244/194, 195, 75 R, 192; 91/509; 73/802, 178 T, 781; 318/563–565, 611, 624

[56] References Cited

U.S. PATENT DOCUMENTS

| | | | |
|---|---|---|---|
| 3,095,783 | 7/1963 | Flindt | 244/194 |
| 3,464,319 | 9/1969 | Sherman et al. | 244/194 |
| 3,673,585 | 6/1972 | Tripp et al. | 340/870.31 |
| 3,709,033 | 1/1973 | Pollitt | 73/178 T |
| 3,756,081 | 9/1973 | Young | 340/870.31 |
| 3,813,990 | 6/1974 | Coppola | 244/194 |
| 3,827,291 | 8/1974 | McCalvey | 340/870.35 |
| 3,898,916 | 8/1975 | Renner et al. | 244/194 |
| 4,034,334 | 7/1977 | Allyn | 340/945 |
| 4,302,745 | 11/1981 | Johnston et al. | 340/665 |
| 4,345,191 | 8/1982 | Takats et al. | 244/194 |
| 4,575,027 | 3/1986 | Cronin | 91/509 |
| 4,578,993 | 4/1986 | Burandt | 244/75 R |

FOREIGN PATENT DOCUMENTS 496563  10/1953  Canada ............................. 244/195

Primary Examiner—Joseph A. Orsino
Assistant Examiner—Brent A. Swarthout
Attorney, Agent, or Firm—James P. Hamley; B. A. Donahue

[57] ABSTRACT

A monitoring system for detecting a fault condition in any one of multiple power control actuator units used for positioning an aircraft's control surface includes sensors for producing sense signals corresponding to the load on each actuator unit under a given control surface loading condition. The sense signals are compared with a reference level signal corresponding to a maximum allowable load. An indication is produced in response to the load on any actuator unit exceeding its allowed value.

6 Claims, 2 Drawing Sheets

FAULT MONITORING SYSTEM FOR AIRCRAFT POWER CONTROL UNITS

BACKGROUND OF THE INVENTION

The present invention pertains to the fault detection and indication art and, more particularly, to a system for monitoring fault conditions in any one of several power actuator units used to position the control surface of an aircraft.

Modern aircraft commonly employ multiple hydraulic power actuators to position aricraft control surfaces, such as the elevators or rudder. FIG. 1 is a cutaway, perspective view of an aircraft stabilizer portion 10. Shown is a portion of a conventional elevator 12, which is driven into position by three parallel power servo control units 20, 30 and 40. The input command to each control unit is provided by a pilot's input rod 50. Input rod 50 translates, in the directions indicated, in response to a flight command from the flight deck.

The translation motion of the pilot's input rod 50 causes a rotation of bellcranks 21, 31 and 41. Rotation of the bellcranks 21, 31 and 41 results in a translation of the adjustment links 22, 32 and 42. This creates a rotation of summing levers 23, 33, 43 and a corresponding translation of the first power servo input links 24, 34 and 44. Such translation produces a rotation of the second power servo input links 25, 35 and 45. The second links 25, 35 and 45 connect to the control inputs of conventional hydraulic actuators 26, 36, 46. Pistons within the actuators 26, 36, 46 respond to changes in hydraulic fluid pressure and fluid flow caused by control inputs to deflect corresponding piston rods 27, 37, 47. The piston rods connect to a shaft 52 which, via brackets, such as bracket 54, couple to the elevator 12. The summing levers 23, 33, 43 are pivotally conneted to the piston rods 27, 37, 47, thereby providing a mechanical servo system to assure that each piston rod 27, 37, 47 is positioned proportionally to the translation of the pilot's input rod 50.

Thus, all power servo control units 20, 30, 40 receive essentially identical input commands via the pilot's input rod 50. In the present example, the units 20, 30, 40 are sized comparably such that each shares equally in the load on the elevator 12.

In addition, if any one of the units 20, 30, 40 fails the remaining functioning units are capable of overpowering the failed unit, thereby maintaining position control of the elevator surface 12. Such failures are typically passive in nature and would normally go unnoticed by the flight crew until such time as a considerable amount of control power was required to position elevator 12, or until an additional failure in one of the power servo control units occurred. The condition of excess power required to control the elevator 12 might result in reduced elevator control, thereby reducing flight control of the aircraft. In the event of a second power servo control unit failure, a similar flight problem could occur. It is desirable, therefore, to detect first failures promptly, such that they may be corrected prior to the development of a more serious condition.

The power servo control units are subject to three failure modes of primary concern:
 jamming of the control valve;
 a disconnect between the control valve and the control surface; and,
 a disconnect or shearout of the control linkage.

The prior art has developed numerous systems to detect a failure in a power servo control unit. In one such system, a valve jam causes a detented bundee in the control linkage to move, thereby actuating a switch and annunciating the condition. In a second approach, a valve jam causes a detented valve within the primary control valve to port fluid to a pressure switch, thereby annunciating the failure. In a third prior art approach, upon valve jam, the detented bungee in the control linkage moves, thereby changing the normal control feel forces in the system, allowing pilot detection.

In all of these prior art systems, only valve jams are detected, all other failures of concern being detected only upon inspection.

An additional problem with such prior art failure detection systems is that they do not provide a means to detect a misrigging, or other power servo control unit overloading condition, which, although not representing a failure of the servo control unit, nonetheless results in reduced useful life of the servo control unit system and structure. For example, referring to FIG. 1, during rigging of the power servo control units 20, 30, 40, adjustments are made on links 22, 32, 42 to minimize mistracking among the power servo control units. Such mistracking leads to a 'force fight' among the units. The failure to properly set these adjustment links, or misrigging caused by other conditions such as damage to one of the linkage members, may result in a substantial mistracking of the servo control units. This, it has been shown, results in the aforementioned 'force fight' with a reduced expected lifetime of the servo control units and structure.

There is a need in this art, therefore, for a fault monitoring system which is capable of detecting and indicating any type of excessive load producing fault in a power servo control unit. In addition, there is a need in this art for such a monitoring and indicating system which is capable of detecting misrigging or other mistracking conditions which may lead to reduced component life.

SUMMARY OF THE INVENTION

It is an object of this invention, therefore, to provide a power servo control unit fault monitoring system which is capable of detecting any type of excessive load producing fault in a power servo control unit.

It is a further object of the invention to provide the above-described fault monitoring system which is capable of detecting and indicating a misrigging, or other mistracking of multiple power servo control units.

Briefly, according to the invention, a monitoring system detects a fault condition in any one of multiple actuation units used in an aircraft control surface positioning system. The monitoring system comprises activation means for detecting the presence of a predetermined load condition on the control surface and activating the monitoring system in response thereto. A sense means produces a sense signal related to the load at each actuator unit. Reference level means produces a predetermined reference level signal. A comparator compares each sense signal with the reference level signal and produces a fault signal in reasponse to a predetermined relationship therebetween. Indicator means produces a fault indication in response to a comparator means produced fault signal.

DETAILED DESCRIPTION

Figure 1:
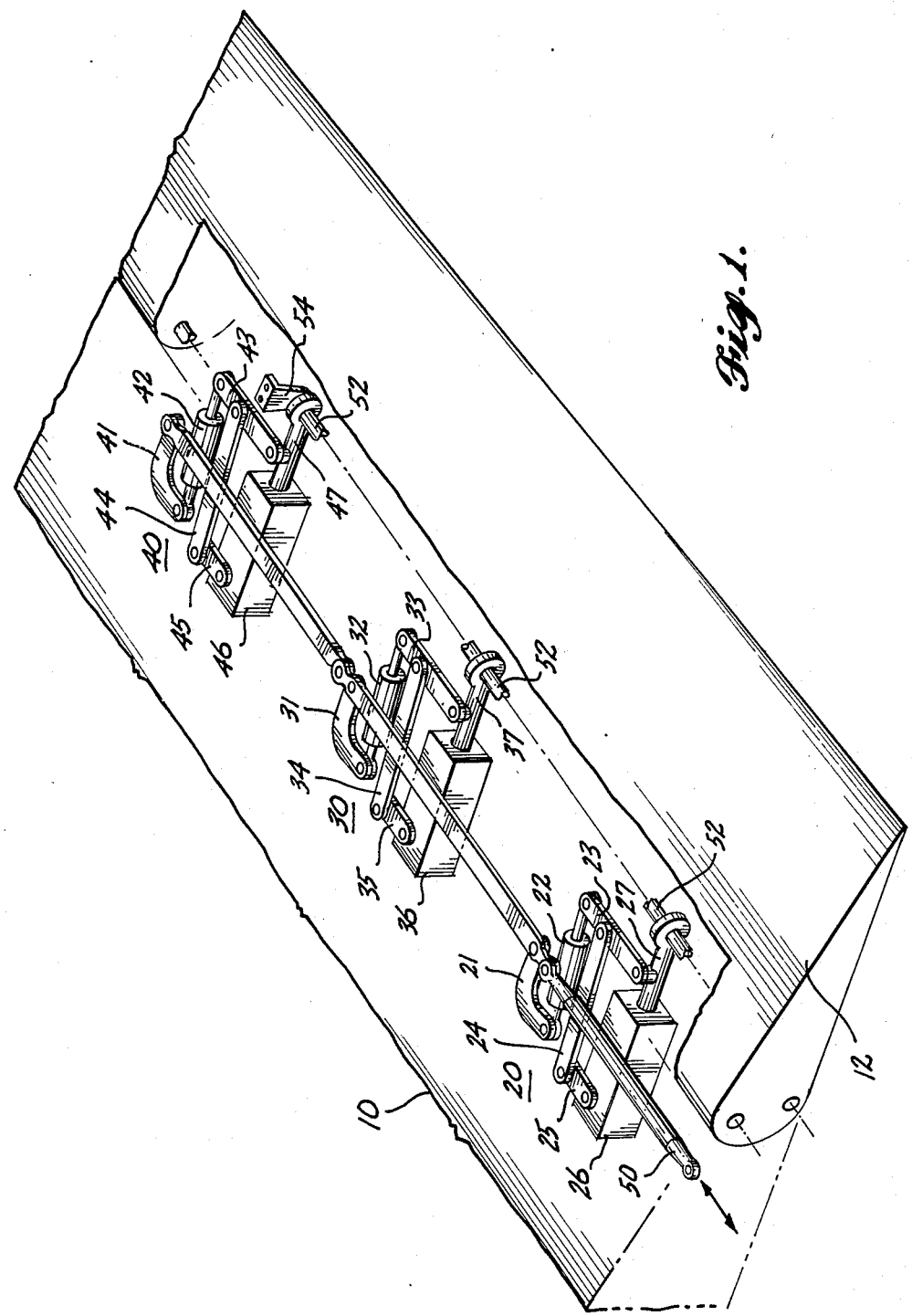
FIG. 1 is a cutaway, perspective view of an aircraft stabilizer section illustrating an elevator which is positioned by three parallel power servo control units.

FIG. 1 is a cutaway, perspective view of an aircraft stabilizer 10. Shown is an elevator portion 12 which is positioned by three parallel power servo control units 20, 30, 40 in response to the pilot's input rod 50. Operation of the power servo control units is described above.

Figure 2:
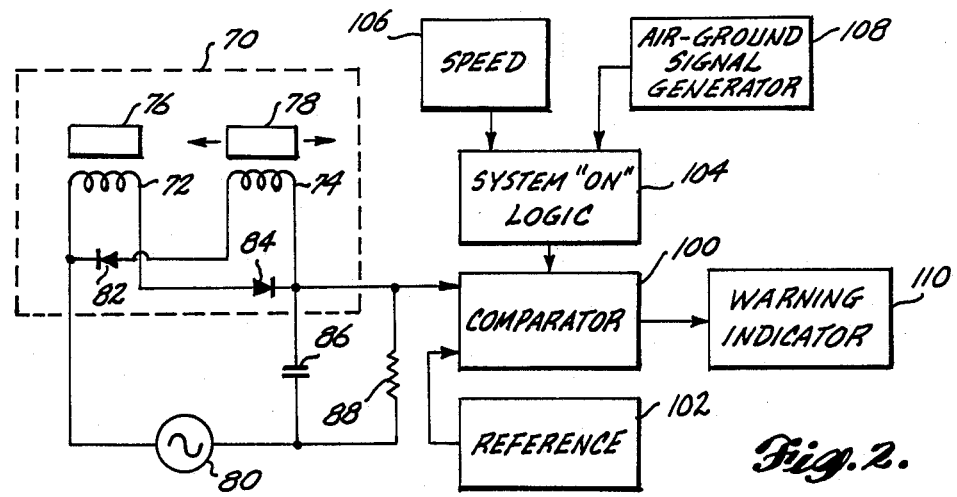
FIG. 2 is a schematic diagram illustrating the preferred embodiment of the fault monitoring system.

FIG. 2 is a schematic diagram of the preferred power servo control unit fault monitoring system. The system employs a two-wire transducer 70. Two-wire transducer 70 includes two inductors 72, 74, each of which has a corresponding slug 76, 78, respectively. Slug 76 is fixed with respect to inductor 72, whereas slug 78 may move, in the direction shown, with respect to inductor 74. Such two-wire transducers are available from Parker-Bertea Company, Irvine, California. Such transducers are available such that the movement of slug 78 is a function of a differential pressure. Thus, in the preferred embodiment of the invention, sensor 70 is selected such that movement of the slug 78 is a function of the pressure differential across the piston included within a hydraulic actuator, such as any one of the actuators 26, 36 and 46 of FIG. 1. The movement of slug 78, and, thus, the inductance presented by inductor 74 is a function of the loading at the output of the pressure servo control unit.

The inductors 72, 74 are connected to an AC signal generator 80 via diodes 82, 84, a capacitor 86 and a resistor 88. Inductors 72, 74, and the slugs 76, 78 are selected such that when movable slug 78 is positioned directly opposite inductor 74, the inductances presented by inductors 72, 74 are equal. Thus, in response to an applied sine wave from generator 80, the signal appearing across capacitor 86 and resistor 88 is symmetrical, as shown in graph 90 of FIG. 3. If, however, slug 78 is moved out of alignment with inductor 74, the inductance presented by inductor 74 changes, resulting in an asymmetrical waveform, such as waveform 92 of FIG. 3. Whereas symmetrical waveform 90 has a zero DC component, the waveform as shown at 92 presents a net DC component, indicated by line 94.

The DC component appearing across capacitor 86 and resistor 88 is applied as an input to a comparator 100. The other input to comparator 100 is provided by a reference circuit 102.

Comparator 100 is activated by a system 'on' logic block 104. Logic block 104 receives inputs corresponding to the speed of the aircraft, at 106, and to the condition of the aircraft being on the ground or in the air, via air-ground signal generator 108. The output from comparator 100 connects to a warning indicator 110 located in the flight deck.

Operation of the circuit of FIG. 2 is understood as follows. The present fault monitoring system operates to monitor the load presented at each power servo control unit for a given loading on the corresponding aircraft control surface, compare this load to a defined limit, and indicate a warning in response to the actual load exceeding the limit.

Thus, in the circuit of FIG. 2, the monitoring system is activated only if the speed of the aircraft, provided by speed input 106, indicates a speed less than a given value, e.g., 50 knots, and the air-ground signal generator 108 indicates that the aircraft is on the ground. Given these conditions, which correspond to a defined loading on the elevator, logic 104 activated comparator 100.

Thus, whenever the airplane is traveling less than a defined speed and is on the ground, the system of FIG. 2 is operable.

Figure 3:
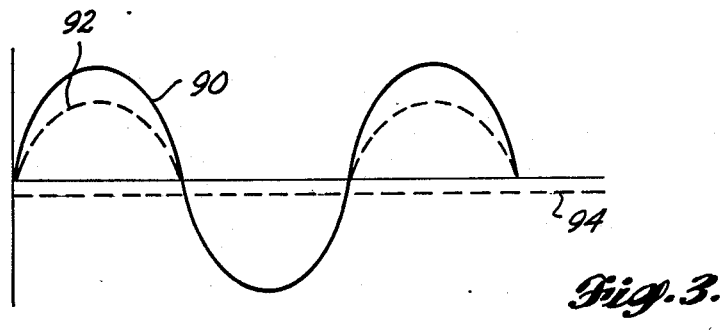
FIG. 3 illustrates typical waveforms produced by the circuit of FIG. 2.

The position of slug 78 in transducer 70 is selected such that for differential pressures across the piston of the power servo control unit being monitored less than a maximum allowable level (corresponding to a maximum load limit), the slug 78 is aligned with inductor 74. Differential pressures exceeding the defined limit causes a translation of slug 78 and a corresponding reduction in the inductance presented by inductor 74. This, as illustrated in FIG. 3, results in a net DC voltage being produced at the input of comparator 100. If this DC voltage exceeds that voltage produced by reference circuit 102, the comparator activates the warning indicator 110. Reference circuit 102 is, therefore, designed to produce a reference DC voltage level corresponding to that voltage which would be produced by transducer 70 under a maximum allowable loading condition.

The circuit of FIG. 2, therefore, is seen to provide a warning indication to the flight crew of any type of excessive load producing fault in the power servo control unit.

It should be noted that the reference level produced by reference 102 may be selected such that the comparator 100 produces an output warning indication at indicator 110 in response to misriggings, or other conditions which create excessive loads on the power servo control units.

Figure 4:
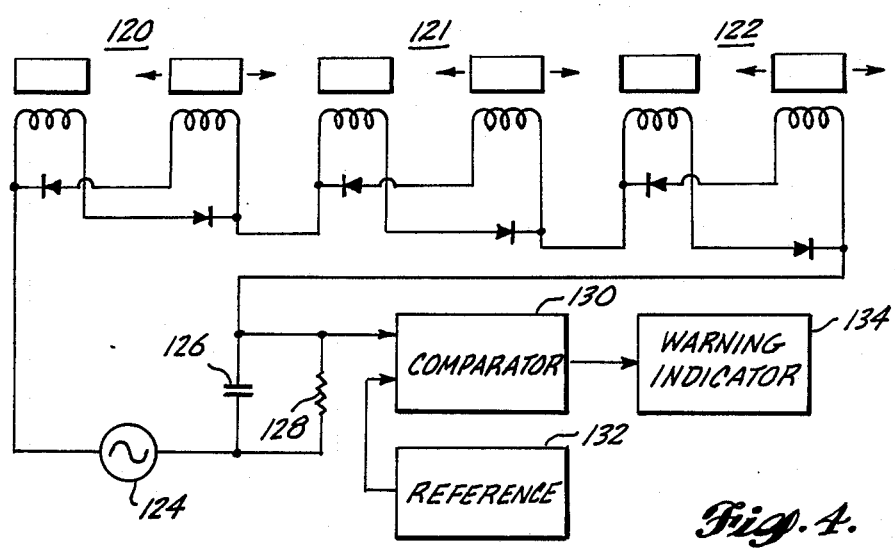
FIG. 4 is a detailed schematic diagram of the preferred embodiment of the fault monitoring system for use with three power servo control units.

FIG. 4 is a schematic diagram of the preferred embodiment of the failure monitoring system for use in a control surface actuation system employing three power servo control units. Here, each of three two-wire transducers 120-122 monitors the differential pressure across the pistons of a corresponding one of three actuators, such as actuators 26, 36 and 46 of FIG. 1.

The two-wire transducers are mounted in series, as shown, with the AC signal source 124 and parallel connected capacitor 126 and resistor 128. As with the circuit of FIG. 2, the DC component across parallel capacitor 126 and resistor 128 is applied to one input of a comparator 130, having a second input provided by a reference circuit 132. The output from comparator 130 connects to a warning indicator 134. While not shown, the comparator 130 is activated by system 'on' logic identical to that shown with respect to FIG. 2.

It will be seen that the DC voltage fed to the comparator 130 directly corresponds to the sum of the DC offsets created by each of the three wire transducers 120-122. Thus, for example, a first level DC voltage sense signal applied to comparator 130 indicates an excessive load in one of the power servo control units, whereas a higher sense voltage reflects an overload condition in two or more of the power serve control units. The circuit of FIG. 4, therefore, provides a convenient means to monitor a fault condition in one or more multiple power servo control units.

In summary, a fault monitoring system for power servo control units used to position the control surface of an aircraft has been described in detail. The system is capable of detecting any type of excessive loading power servo control unit fault condition and is particularly suited for monitoring faults in any one of several parallel power servo control units.

While a preferred embodiment of the invention has been described in detail, it should be apparent that many modifications and variations thereto are possible, all of which fall within the true spirit and scope of the invention.

For example, whereas in the preferred embodiment of the invention, the control surface loading occurring with the airplane on the ground and at less than a defined maximum speed was used for the power servo control unit load test condition, it should be understood that any definable control surface loading may be used.

The embodiments of the invention in which an exclusive property or privilege is claimed are as follows:

1. In an aircraft control surface positioning system wherein multiple actuator units respond to a control input to position the control surface, a monitoring system for detecting a fault condition in any one of said actuation units, the monitoring system comprising:

activation means for detecting the presence of a predetermined load condition on the control surface and activating the monitoring system in response thereto;

sense means for producing a sense signal related to the load at each actuator unit;

reference level means for producing a predetermined reference level signal;

comparator means for comparing each sense signal with said reference level signal and producing a fault signal in response to a predetermined relation therebetween; and, indicator means for producing a fault indication in response to a comparator means produced fault signal.

2. The monitoring system of claim 1 wherein the activation means comprises:

logic means adapted to respond to aircraft sensor produced signals indicative of the aircraft being on the ground and having a speed less than a predetermined value to thereby activate the monitoring system.

3. The monitoring system of either of claim 1 or 2 wherein each actuator unit includes a hydraulically driven piston, the piston being connected through linkage to the aircraft control surface, and wherein the sense means comprises:

a plurality of pressure differential transducers, each pressure differential transducer producing a sense signal related to the hydraulic pressure differential across an associated hydraulically driven piston.

4. The monitoring system of claim 3 wherein the reference level means includes means for producing said reference level signal at a value corresponding to that signal level produced by said pressure differential transducer in response to a maximum allowable load being applied to the actuator unit piston by the aircraft control surface during said predetermined load condition on the aircraft control surface.

5. The monitoring system of claim 3 wherein each pressure differential transducer comprises:

an inductor having an associated slug, the slug being predeterminedly movable in response to an applied differential pressure such that the inductance of the inductor varies as a function of the position of the slug; and, means for producing a sense signal related to the inductance of the inductor.

6. The monitoring system of claim 5 further comprising: means for producing a DC signal corresponding to the combined positions of the slugs associated with each inductor, thereby producing a sense signal related to the cumulative loading on all of the actuator units.

* * * * *